L. THOMAS.
MOLDING MACHINE.
APPLICATION FILED AUG. 4, 1914.

1,213,436.

Patented Jan. 23, 1917.
6 SHEETS—SHEET 1.

L. THOMAS.
MOLDING MACHINE.
APPLICATION FILED AUG. 4, 1914.

1,213,436.

Patented Jan. 23, 1917.
6 SHEETS—SHEET 4.

UNITED STATES PATENT OFFICE.

LÉON THOMAS, OF LA MAGDALEINE, NEAR SOISSONS, FRANCE, ASSIGNOR TO SOCIETE LES FILS DE A. PIAT & CIE., OF PARIS, FRANCE.

MOLDING-MACHINE.

1,213,436.                Specification of Letters Patent.        Patented Jan. 23, 1917.

Application filed August 4, 1914.   Serial No. 855,060.

*To all whom it may concern:*

Be it known that I, LÉON THOMAS, a citizen of the French Republic, residing at La Magdaleine, near Soissons, Aisne, France, have invented a new and useful Molding-Machine, of which the following is a specification.

The present invention has for its object to provide a machine for molding an article and withdrawing it from the mold of the type in which the free fall under the action of gravity of a piston is utilized for compressing sand by re-action.

In the machine forming the object of the invention, instead of lifting the piston by means of a mechanical device such as a cam, by means of compressed air or in any other known manner, the piston is lifted by means of a plunger electro-magnet of which the said piston forms the core. The same electro-magnet device is applied in the machine forming the object of the invention for the displacement of the piston-anvil serving to absorb the shock. Finally the machine is characterized by its various arrangements hereinafter described and in particular by the combination of a plunger pump automatically controlled by the displacement of the piston-anvil, which pump delivers liquid under pressure into an accumulator with the object hereinafter explained; by the method of construction of the table, by which the withdrawal is effected, mounted upon a ball joint permitting slight displacements of the said table; by the application of an electro-magnetic vibrator; by the arrangements of control mechanism conveniently grouped within reach of a single operative; by the organization of the electric circuits combined in such a manner that the work is effected almost automatically, and so forth.

The accompanying drawings represent, by way of example, a construction of such a machine.

Figure 1:
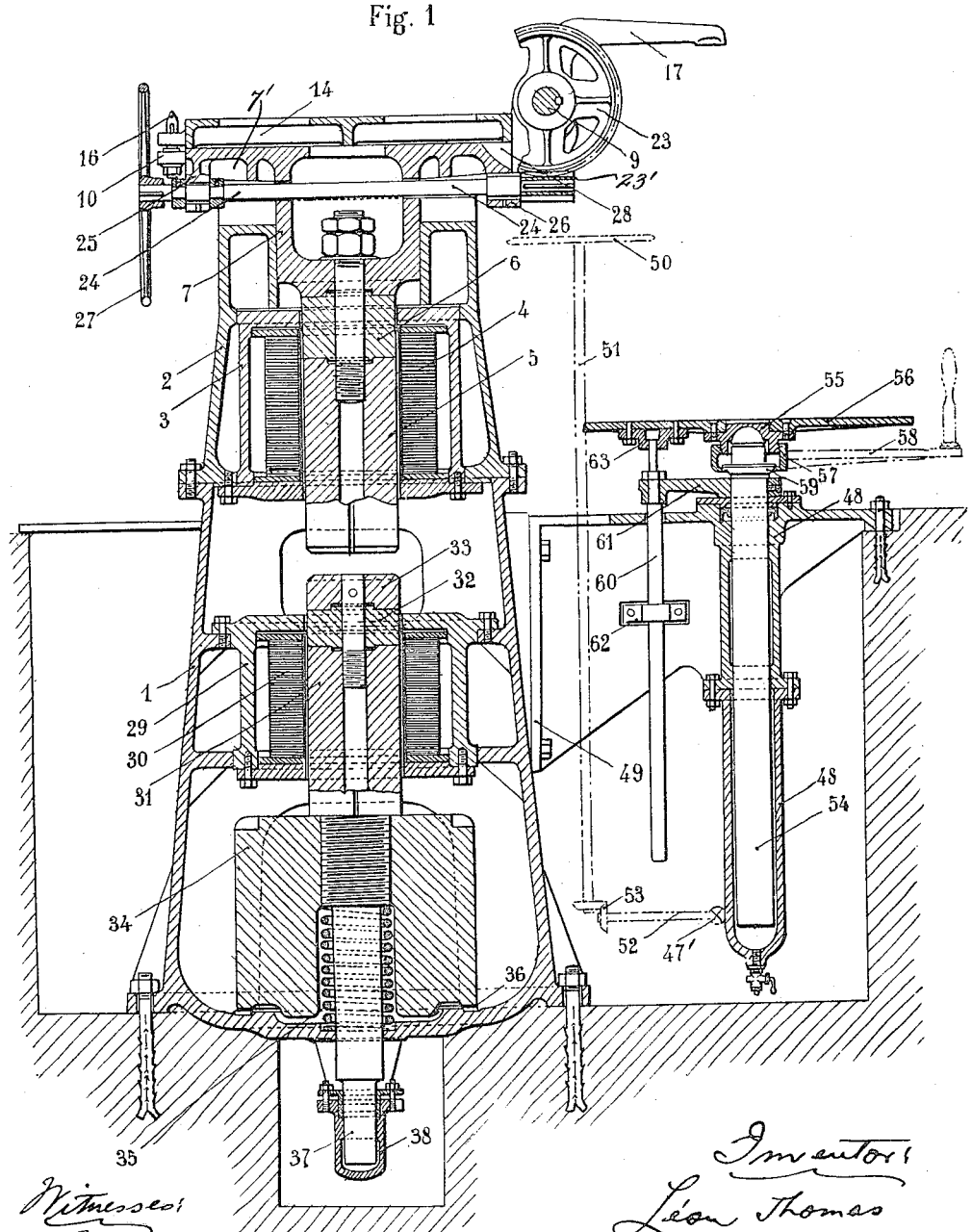
Figure 2:
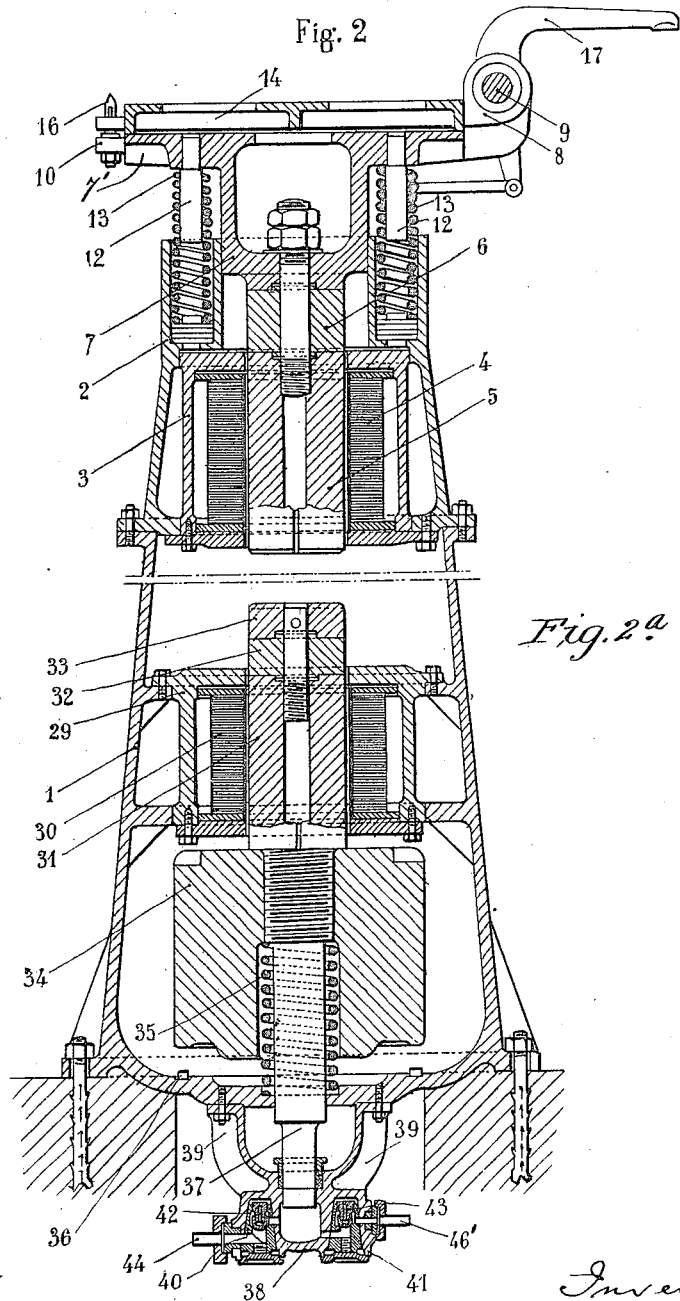
Figure 3:
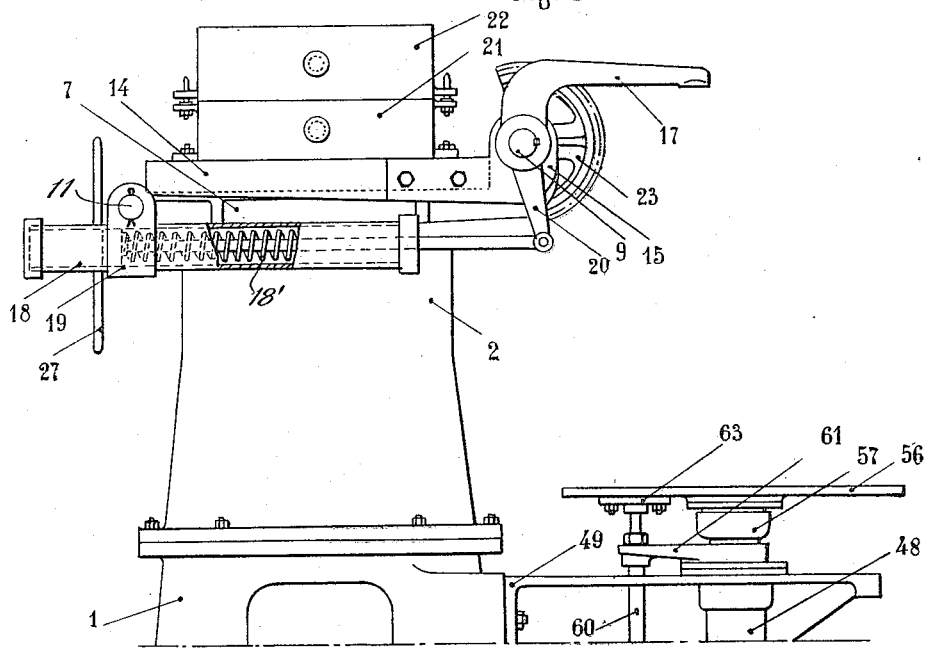
Figure 4:
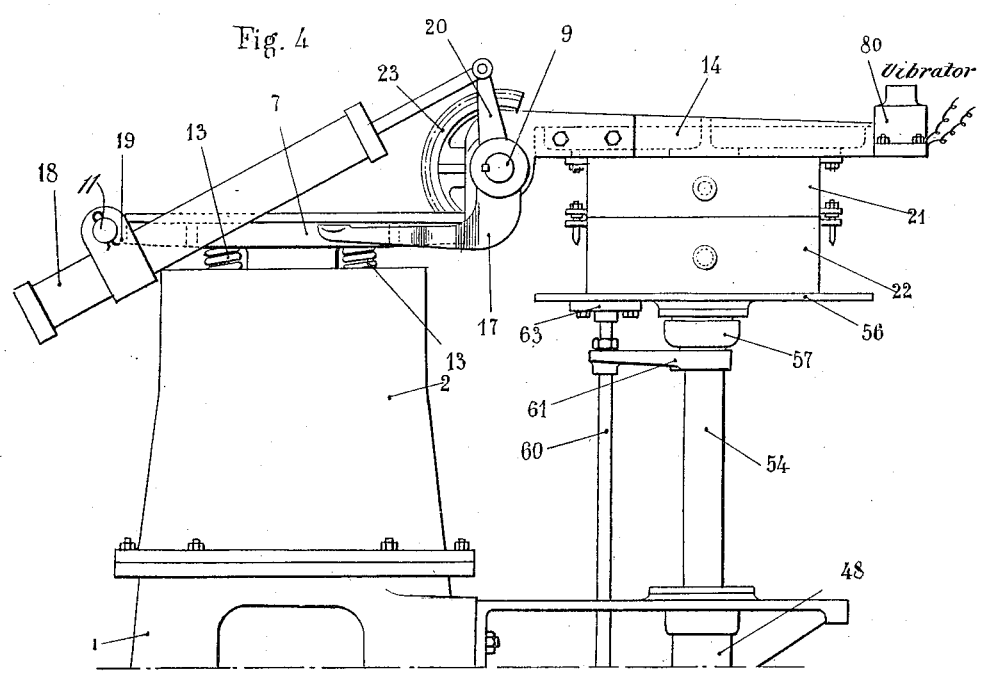
Figure 5:
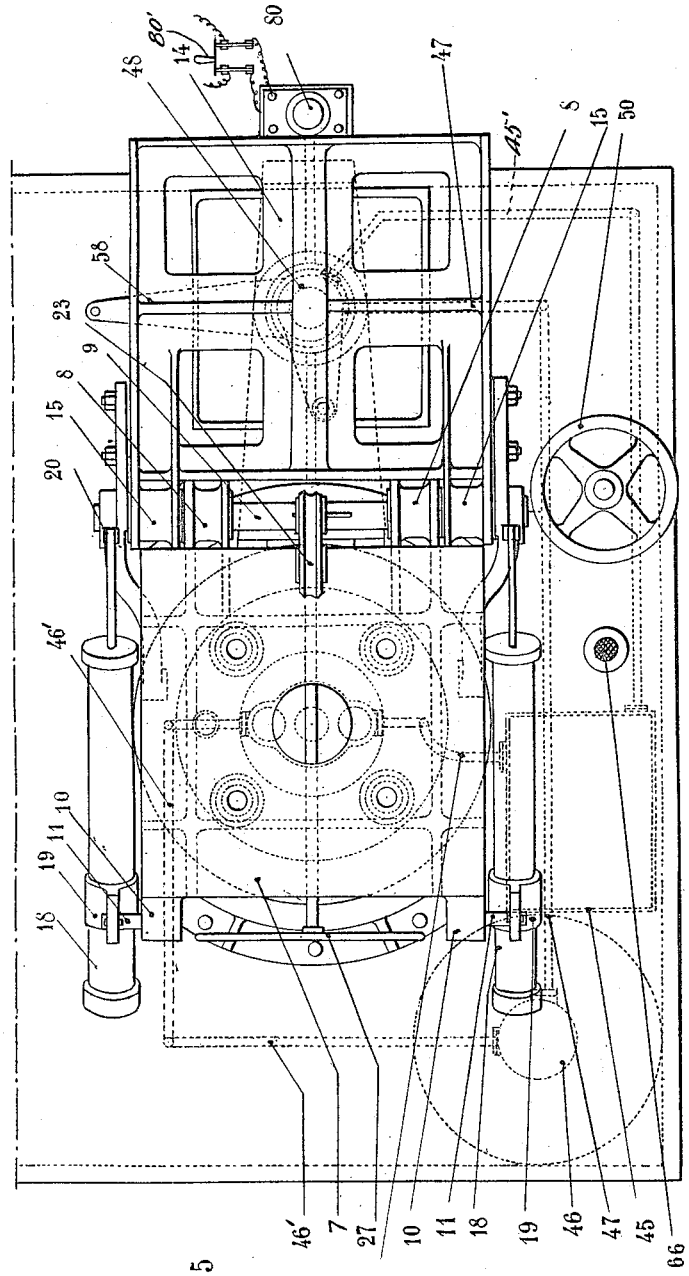
Figure 6:
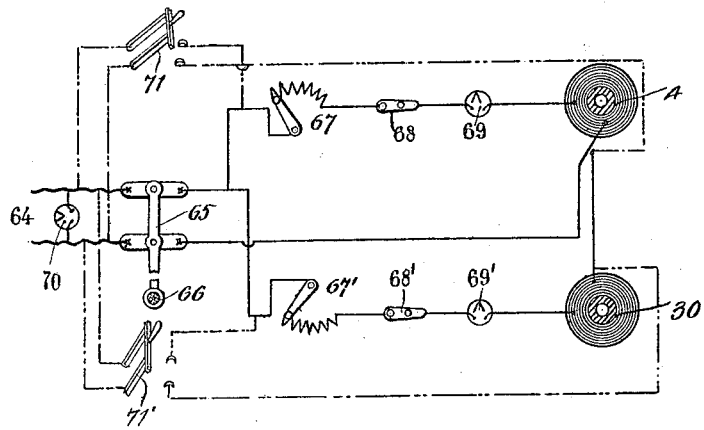
Figure 7:
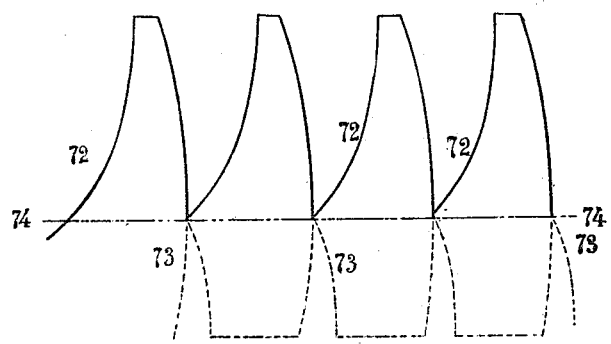

In these drawings:—Figure 1 shows a gravity magneto machine for molding an article and withdrawing the pattern from the mold in central vertical section; the machine is assumed to be at rest; Figs. 2, 2ª are vertical sectional views taken at right angles to each other and arranged to show the two pistons at the highest points of their strokes; Fig. 3 is a front elevation partly in section showing the position of the frame after the compression of the sand and before reversal; Fig. 4 represents the position of the frame after reversal and before the withdrawal of the article from the mold; Fig. 5 is a plan view; Fig. 6 is a diagram of the electrical switch board; and Fig. 7 is a graphic representation of the paths traversed by the two pistons.

The machine is composed of two superposed frusto-conical bases 1 and 2. At the center of the base 2 a cylindrical casing 3 is bolted; this casing serves for the reception of an electro-magnet 4 of the plunger type constituted by a bobbin upon which convolutions of insulated copper wire are wound. At the center of the electro-magnet 4 a cylindrical core of soft iron 5 is arranged; this core is prolonged by a forged bronze washer 6 and by a cast iron member 7 expanded above into a flat head 7′ which will be termed the "fixed table" and which is provided with two lugs 8 through the center of which a shaft 9 passes, and two lugs 10 and two shafts 11; this table is also perforated by four holes for the reception of rods 12 serving as guides for compression springs 13 which fit in recesses in the base 2. Upon this table 7′ another table 14, which will be termed the "movable table," is arranged; this second table is provided with two lugs 15, Fig. 5, through which the shaft 9 passes, the table 14 being capable of oscillation about this shaft. The table 14 is fixed upon the table 7′ during the compression of the sand by means of two cotter pins 16. After reversal and during the withdrawal of the article from the mold its horizontal position is insured by two forged steel levers 17 bolted to the movable table, as in Fig. 3 and adapted to engage beneath the fixed table 7′ when the frame is turned over.

The movable table 14 is balanced by compression springs 18′ arranged in sleeves 18 each provided with a socket 19 which permits of a movement of oscillation about the shafts 11; these springs act through members 19′ attached to levers 20 keyed upon the shaft 9. An electro-magnetic vibrator 80 is also mounted on the table 14. Finally this table is arranged for the reception of the bed frame 21 and the molding frame 22 (Fig. 3).

Upon the shaft 9 is keyed a sector 23 forming a worm wheel meshing with a worm 23' on shaft 24 rotatably mounted in two supports 25 and 26 cast with the table 7'; an operating hand wheel 27 is keyed to the free end of this shaft; finally the table 7' is recessed at 28 to permit of the passage of the worm wheel.

At the center of the base 1 a casing 29 is bolted and in this casing an electro-magnet 30 also of the plunger type is fixed; through the center of this magnet there passes a soft iron core 31 which is prolonged by a hard bronze washer 32 and by a steel bead 33 which strikes against the shaft 5 when the machine is in action.

A cast iron counter weight 34 is screwed and keyed upon the shaft 31; it is partially balanced by a spiral compression spring 35 bearing on the lower part of the base 1. The shock of the counter weight is deadened by an india rubber washer 36. The shaft 31 ends in a plunger 37 working in a pump body 38 which is secured to the base 1 by two yoke pieces 39; this pump comprises two valve chests 40 and 41, one provided with a suction valve 42 and the other with a delivery valve 43; the suction pipe 44 is connected with a tank 45, Fig. 5, containing glycerin or oil; the delivery piping 46' communicates with an accumulator 46 arranged in the trench for the machine. This accumulator, which comprises an automatic overflow valve with return to the tank, communicates through the pipe 47 with a cylinder or pressure cylinder 48 bolted by means of an angle iron 49 to the base 1 of the machine. A three-way cock 47' is arranged on the pipe 47 and is controlled by means of the hand wheel 50 through the intermediary of the shafts 51, 52 and of the bevel gear 53; this cock places the cylinder 48 in communication with the accumulator 46 when filling is being effected, and places in communication the cylinder 48 and the tank 45 through pipe 45' during emptying; an overflow pipe with automatic valve is also provided.

A plunger piston 54 is displaced in the cylinder 48, its head forming a double ball joint (see Fig. 1); the upper spherical portion is capped by a part 55 of cemented steel bolted to the table 56 by which the withdrawal from the mold is effected. A socket 57 forming a nut is screwed onto the cap 55, and, through the intermediary of the lever 58, enables a grip to be secured beneath the spherical shoulder 59 of the piston 54; the guide rod 60 which is connected with the piston 54 by the arm 61 passes through a guide support 62 and ends at its upper part in a step bearing 63 bolted beneath the table 56. This device as a whole permits of a slight angular displacement of the table relatively to the piston and of locking this table in any desired position. The purpose of this arrangement is hereinafter explained.

The electrical distribution switchboard comprises: the two line wires 64, a switch 65 operated by the foot by means of the pedal 66 (Fig. 5) a rheostat 67, 67', a circuit breaker 68, 68' and an ampere meter 69, 69' each arranged upon circuits of the electro-magnets 4 and 30; this switchboard is completed by a volt meter 70 and by two switches 71 and 71' which, while open during normal operation, render it possible to place one electro-magnet in circuit independently of the other if desired.

Fig. 7 shows the relative displacements of the two cores acted upon by the electro-magnets in the form of a graph on which the times are referred to abscissæ and the strokes to ordinates; the firm curve 72 represents the movement of the core 5 and the broken curve 73 the movement of the core 31; the straight line 74 is the geometrical locus of the meeting points of these two bodies.

*Operation of the machine.*—The molding frame 22 which is keyed upon the bed plate 21 is filled with sand with the customary precautions; the workman presses with his foot upon the pedal 66 operating the switch 65; the current passes through the resistance 67, the break device 68, the ampere meter 69 and reaches the electro-magnet 4; the magnetic field tends to close and produces the upward movement of the soft iron core 5; the current is then automatically interrupted in the circuit of the electro-magnet 4 by circuit breaker 68 and supplied to the electro-magnet 30 through the resistance 67', the circuit breaker 68' and the ampere meter 69'; the core 31 is drawn upward, but at the same time the core 5, which is no longer retained by the electro-magnet 4, falls under the influence of gravity and at the moment of the impact two phenomena occur; a loss of *vis viva* which is utilized by reaction for the compression of the sand in the frame and a variation of velocity of the bodies in movement. At the moment of impact the current is again automatically supplied to the electro-magnet 4 (the workman pressing upon the pedal 66 until the completion of the operation) then interrupted at 4 and again supplied to the electro-magnet 30 and so on in succession. The masses and the velocities of the two bodies in movement (tables, patterns and frames raised by the piston 5; counterweight 34 raised by the piston 31) are regulated in such a manner that the *vis viva* of the two assemblages is equal at the moment at which they meet, whereby reactions upon the base and upon the foundations of the machine, are almost completely avoided. The shock is also absorbed by the plunger piston 37 which works in the pump body 38 in the following manner: When, at each pulsation, this piston, integral with the shaft 31, rises under the influence of the electro-magnet 30, the suction valve 42 opens and the liquid fills the pump body; at the moment of impact, this liquid deadens the fall, closes the valve 42, opens the valve 43 and by means of the delivery piping 46′ enters the accumulator 46 (Fig. 5) which ascends by a given amount at each operation. The object of this accumulator is to insure that there may, at all times, be a sufficient reserve of liquid under pressure and it thus serves to compensate for leakages at joints, cocks or the like. After the electro-magnets have been placed in circuit fifteen to twenty times in succession, the frame is tightened up; the workman then releases the pedal 66 and withdrawal from the mold is effected; in doing this, the keys are withdrawn from the cotter pins 16, the springs arranged in the sleeves 18 act upon the levers 20 and the movable table 14 tends to oscillate about the shaft 9; the reversing movement is assisted by acting upon the hand wheel 27 which, through the intermediary of the worm 24, drives the worm wheel 23 keyed upon the shaft 9, and, as the springs 18′ are dimensioned in such a manner as to counter-balance almost completely the moment resulting from the weight of the movable table and of the frame in all positions, whatever the leverage may be, the effort to be exerted upon the hand wheel is very small. After a rotation through 180° the levers 17 engage beneath the fixed table 7′, the movable table is turned over and the frame suspended (position shown in Fig. 4). The workman then acts upon the lever 58, rotating it through approximately 45° in order to unlock the ball joint of the table 56; he then rotates the hand wheel 50 in the direction indicated by an arrow to open the cock 47′ for the admission; the liquid compressed by the accumulator 46 enters the pressure cylinder 48 and the plunger piston 54 rises until the moment at which the table 56 bears beneath the frame 22 that it is intended to receive (Fig. 4); if the lower face of this frame is not absolutely parallel with the plane of the joint, which is generally the case, the ball joint permits of a slight movement of the table, which, nevertheless, bears firmly beneath the frame; the ball joint is then locked by tightening the lever 58 and the keys fixing the mold to the pattern plate are then removed. By means of a suitable switch 80′ placed conveniently within reach, the workman then causes the current to pass into the vibrator 80 (Figs. 4 and 5) which produces the vibration of the bed plate; then by turning the hand wheel 50 he opens the cylinder 48 for the discharge as slowly as desired through the intermediary of the three-way cock 47′; the liquid returns to the tank 45, through pipe 45′, the piston 54 descends carrying with it the table 56 and the frame 22 which separates from the movable plate 21, the rod 60 providing efficient guidance. Finally the movable table 14 having returned to the fixed table 7′ is ready for a fresh operation. It will be noted that this ball joint mounting of the table, the utility of which is very great in practice, is also applicable to machines of other types than that described above.

To sum up, the invention has for its object a machine for molding an article and for withdrawing it from the mold comprising a piston (upper piston) whose free fall under the influence of gravity is utilized for compressing the sand by reaction and a second piston (piston-anvil) or lower piston serving to deaden the shock, this machine being essentially characterized by:

What I claim is—

1. In a mold jarring machine, the combination of a base, a table yieldingly supported on said base, a flask tilting table hinged to the first table and means for tilting the same, a stationary magnet coil having a movable core supported by the first-named table for lifting the same, a second stationary magnet coil having a movable core in line with the first core and adapted to act as an anvil for the first core, means for alternately energizing said coils to lift one core while the other is falling by gravity, a pump having a shock-absorbing piston operating counter to the anvil core, a receiving table associated with the tilting table, and a hydraulic lift for the receiving table and having operating connections with said pump, and means for controlling said connections.

2. In a mold jarring machine, the combination of a table, electromagnetic means for jarring the same, a receiving table provided with hydraulic lifting means, a pump having a plunger piston operated by said magnetic means, conduit connections between said pump and hydraulic means including a pressure accumulator, and valve means for controlling the fluid supply to said hydraulic means.

3. In a mold jarring machine, the combination of a base, a vibratory table yieldingly supported on said base, a solenoid having a core for intermittently lifting said table and a second solenoid arranged below the first having a core adapted to act as an anvil for the first core, and means for alternately energizing said solenoids to lift one core while the other is falling by gravity, said second core being provided with means for retarding its fall.

4. In a mold jarring machine, the combination of a base, a table yieldingly supported on said base, a stationary magnet coil having a movable core supported by said table for lifting the latter, a second stationary magnet coil having a movable core in line with the first core and adapted to act as an anvil for the first-named core, and means for alternately energizing said electromagnet to lift one core while the other is falling by gravity.

5. In a mold jarring machine, the combination of a table provided with electromagnetic means for jarring the same, a second table hinged to the first-named table for receiving a mold and provided with arms adapted to engage beneath the first-named table to hold the second table in horizontal position when in tilted position, yielding means for balancing the second table, means for tilting the table, and an electromagnetic vibrator for jarring the mold when the table is in position for withdrawal.

6. In a mold jarring machine, the combination of a table provided with electromagnetic means for jarring the same, a second table hinged to the first-named table for receiving a mold and provided with arms adapted to engage beneath the first-named table to hold the second table in horizontal position, when in tilted position, means for tilting the table, and a vertically movable receiving table provided with a ball and socket support for permitting the receiving table to adjust its plane to that of the second table, and means for locking the said joint.

7. In a mold jarring machine, the combination of a base, a vibratory table yieldingly supported on said base, a solenoid having a core for intermittently lifting said table and a second solenoid arranged below the first having a core adapted to act as an anvil for the first core, and means for alternately energizing said solenoids to lift one core while the other is falling by gravity, said second core being provided with a counter-weight and yielding means for retarding its fall.

In testimony whereof I affix my signature in presence of two witnesses.

LÉON THOMAS.

Witnesses:
  ELY E. PALMER,
  MIGUEL FEROLO.

Copies of this patent may be obtained for five cents each, by addressing the "Commissioner of Patents, Washington, D. C."